2,961,463

NITRO-ANILINE DISULFONYL CHLORIDES

Frederick C. Novello, Lansdale, Pa., assignor to Merck & Co., Inc., Rahway, N.J., a corporation of New Jersey No Drawing. Filed Sept. 13, 1957, Ser. No. 683,705

7 Claims. (Cl. 260—543)

This invention is concerned with novel nitroaniline-disulfonyl chloride compounds having the general structure

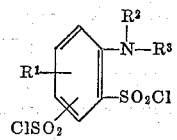

wherein $R^1$ is the nitro radical, $R^2$ is hydrogen or a lower alkyl radical having advantageously from 1 to 5 carbon atoms; and $R^3$ is hydrogen, a lower alkyl radical having advantageously from 1 to 5 carbon atoms, a lower alkanoyl radical advantageously a straight or branched chain alkanoyl radical having from 1 to 12 carbon atoms such as the formyl, acetyl, caproyl, capryl, lauroyl, and the like radicals, a mononuclear aroyl such as benzoyl or a mononuclear aryl-lower alkanoyl having advantageously from 1 to 3 carbon atoms in the alkanoyl moiety such as phenylacetyl, phenylpropionyl, cinnamoyl, and the like radicals.

The new compounds of this invention are useful intermediates in the preparation of nitrodisulfamylaniline compounds which possess diuretic and/or natriuretic properties, which, in turn, also can be converted to nitrobenzothiadiazine-1,1-dioxide compounds and also to the corresponding aminobenzothiadiazine - 1,1 - dioxide compounds which also possess diuretic and/or natriuretic properties. The conversion of the novel nitroanilinedisulfonyl chloride compounds of this invention to the corresponding nitrodisulfamylaniline compounds is described in my copending United States patent applications, Serial Numbers 582,082, 638,701, 672,126, and 672,127. The conversion of the novel nitroanilinedisulfonyl chloride compounds of this invention to the corresponding nitrobenzothiadiazine-1,1-dioxide compounds also is described in my copending United States patent applications, Serial Numbers 582,082, 672,126, and 672,127. This application is a continuation-in-part of each of the applications identified above, Serial No. 582,082 filed by myself May 2, 1956; Serial No. 638,701 filed by myself February 7, 1957; Serial No. 672,126 filed by myself July 16, 1957, and now U.S. Patent 2,910,473; and Serial No. 672,127 filed by myself July 16, 1957, and now U.S. Patent 2,910,474; each of which last three applications also is a continuation-in-part of Serial No. 582,082. U.S. patent application, Serial No. 582,082 issued as Patent No. 2,809,194.

The nitroanilinedisulfonyl chloride compounds of this invention are prepared by the chlorosulfonation of the selected nitroaniline compound, preferably in the presence of an alkali metal halide, for example, sodium potassium or lithium chloride. This reaction can be illustrated by the following reaction scheme:

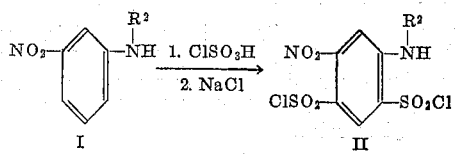

wherein $R^2$ has the meaning assigned to it above and RCO— is a lower alkanoyl, a mononuclear aroyl, or a mononuclear aryl-lower alkanoyl radical of the type described above in the definition of the variable radical $R^3$. For all practical purposes, sodium chloride can be used in the above reaction as it is readily available, cheap, and in its presence the reaction proceeds quite smoothly. As the reaction between the ingredients generally is quite vigorous, it is preferred to add the nitroaniline compound to the chlorosulfonic acid portionwise with stirring and cooling. After all of the nitroaniline compound has been added, the alkali metal halide is added in small portions to allow for the evolution of hydrogen halide at a moderate rate. Following this, the mixture is heated at between about 100–200° C. preferably in an oil bath.

The disulfonyl chloride compound, (II), thus obtained then can be acylated with an organic acid halide or anhydride, the acid advantageously being selected from a lower alkanoic acid such as acetic acid, propionic acid, caproic acid, capric acid, lauric acid and the like, or a mononuclear aryl-monocarboxylic acid such as benzoic acid or a mononuclear aryl-lower alkanoic acid such as phenylacetic acid, phenylpropionic acid, cinnamic acid and the like. This reaction proceeds quite smoothly with moderate heating on the steam bath yielding the N-acyl-anilinedisulfonyl chloride compound, (III). This reaction can be illustrated as follows:

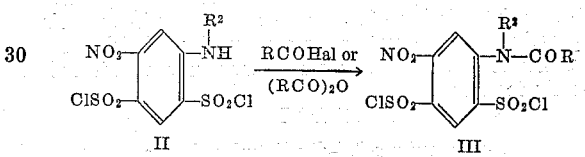

The acylation of Compound II can be carried out at room temperature or, if desired, by warming. At least a molar equivalent of the acylating compounds is employed in the reaction although an excess of the acylating agent can be used if it is desired to have this reactant serve as a solvent for Compound II as well. If because of cost or limited availability of the acylating agent, it is desired to use another solvent in the reaction mixture, this can, of course, be done. Suitable solvents include benzene, toluene, xylene, dioxane or other inert organic solvents which will dissolve Compound II without interfering in any way with the acylating reaction.

Another process for preparing the compounds of this invention, particularly those wherein the nitro substituent is attached to the 4-position and the sulfonyl chloride groups are attached to the 2- and 5-positions can be illustrated as follows:

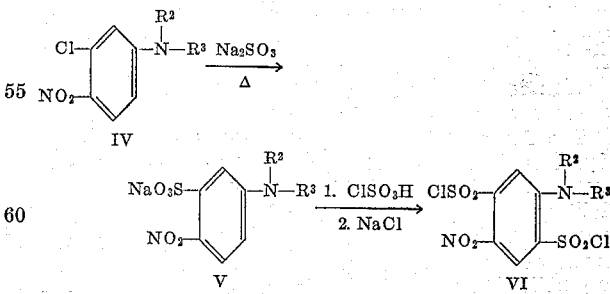

wherein $R^2$ and $R^3$ have the meaning assigned to each of them above. The 3-chloro-4-nitroaniline intermediate in this process is converted to the sodium 5-amino-2-nitrobenzenesulfonate by heating the aniline compound, (IV), preferably under reflux, with sodium sulfite. An excess of sodium sulfite dissolved in water is advantageously employed in this reaction. The reaction product thus obtained, V, then is chlorosulfonated in the presence of an alkali metal halide by the method described above to form the desired 4-nitroaniline-2,5-disulfonyl chloride, (VI).

The nitroanilinedisulfonyl chloride compounds of this invention can be converted to the corresponding nitrodisulfamylaniline compounds by the method described in detail in my copending United States patent applications identified above. In general, the nitroanilinedisulfonyl chloride compounds can be converted by known methods to the corresponding disulfamylaniline compounds by treatment with ammonia or a primary or a secondary amine. The nitrobenzothiadiazine-1,1-dioxide compounds can be prepared from the novel compounds of this invention by the methods described in my copending patent applications identified above. In general, the nitrobenzothiadiazine-1,1-dioxide compounds are prepared by heating the nitrodisulfamylaniline compounds (which are made from the novel compounds of this invention by the method described above), with formic acid or with ethyl orthoformate at between about 100–250° C. after which the solvent can be removed, advantageously by distillation, thus forming the desired nitrobenzothiadiazine-1,1-dioxide product. The nitrobenzothiadiazine-1,1-dioxide compounds also can be prepared directly from the nitro-N-acylanilinedisulfonyl chlorides of this invention by treatment with ammonia or an amine and then heating at between about 150–250° C. thus forming the nitrobenzothiadiazine-1,1-dioxide compound.

The preparation of the nitroanilinedisulfonyl chloride compounds of this invention is more fully described in the following examples. It is to be understood, however, that the examples are illustrative of the compounds embraced by this invention and of the methods for their preparation and are not to be construed as limiting the invention to the particular compounds or methods specifically described.

EXAMPLE 1

*5-nitroaniline-2,4-disulfonyl chloride* m-Nitroaniline (64 g., 0.5 mole) is added dropwise with stirring to 375 ml. of chlorosulfonic acid in a 3 liter, round-bottomed, 3-neck flask, cooled in an ice bath. Sodium chloride (350 g.) is added portionwise over a period of 1 to 2 hours and the mixture then heated gradually in an oil bath to 150° C. After 3 hours at 150–160° C., the flask is cooled thoroughly in an ice bath and the contents treated with a liter of cold water. The product is extracted with ether, the extract washed with water and dried over sodium sulfate. After removal of ether on the steam bath, 5-nitroaniline-2,4-disulfonyl chloride is obtained.

The following procedure illustrates how the nitroanilinedisulfonyl chloride compounds of this invention can be converted to the corresponding nitrodisulfamylaniline compounds which are effective diuretic agents. While the following procedure describes the conversion of 5-nitroaniline-2,4-disulfonyl chloride to the corresponding disulfamyl derivative, any of the other nitroanilinedisulfonyl chlorides falling within the scope of this invention can be converted by substantially the same process to its corresponding disulfamyl derivative.

The 5-nitroaniline-2,4-disulfonyl chloride obtained as described in Example 1 is cooled in an ice bath and treated with 150 ml. of 28% ammonium hydroxide in a 2 liter Erlenmeyer flask. The mixture is heated on the steam bath for one hour, cooled, and the product collected on the filter, washed with water, and dried. Upon crystallization from dilute alcohol, 2,4-disulfamyl-5-nitroaniline is obtained as colorless needles, M.P. 260–262° C.

*Analysis.*—Calculated for $C_6H_8N_4O_6S_2$: C, 24.32; H, 2.72; N, 18.91. Found: C, 24.53; H, 2.71; N, 19.11.

The following procedure describes a method by which the nitrodisulfamylaniline compounds (which are prepared from the nitroanilinedisulfonyl chlorides of this invention) can be converted to the nitrobenzothiadiazine-1,1-dioxide compounds which also possess diuretic properties. While the following procedure describes the conversion of 2,4-disulfamyl-5-nitroaniline (which is synthesized from the 5-nitroaniline-2,4-disulfonyl chloride compound, prepared by the process described in Example 1) to 6-nitro-7-sulfamyl-1,2,4-benzothiadiazine-1,1-dioxide, the following procedure can be followed to convert any other disulfamylnitroaniline (which can be prepared from the nitroanilinedisulfonyl chloride of this invention) to its corresponding nitrobenzothiadiazine-1,1-dioxide compound.

A solution of 5 g. of 2,4-disulfamyl-5-nitroaniline (prepared from 5-nitroaniline-2,4-disulfonyl chloride as described above) in 175 ml. of 98–100% formic acid is heated under reflux for 3 hours. After thorough cooling, the colorless needles are collected on the filter, washed with alcohol, and dried, yielding 6-nitro-7-sulfamyl-1,2,4-benzothiadiazine-1,1-dioxide, M.P. 338–339° C. with decomposition.

*Analysis.*—Calculated for $C_7H_6N_4O_6S_2$: C, 27.45; H, 1.98; N, 18.30. Found: C, 27.73; H, 2.28; N, 18.17.

EXAMPLE 2

*5-nitroacetanilide-2,4-disulfonyl chloride*

A solution of 5.0 g. of 5-nitroaniline-2,4-disulfonyl chloride, obtained as described in Example 1, in 15 ml. of acetic anhydride is allowed to stand at room temperature for 45 minutes. After cooling, the crystalline product, 5-nitroacetanilide-2,4-disulfonyl chloride is obtained.

The following procedure describes how the nitroanilinedisulfonyl chlorides of this invention can be directly converted to the corresponding nitrobenzothiadiazine-1,1-dioxide compounds which possess diuretic properties.

The 5-nitroacetanilide-2,4-disulfonyl chloride, obtained as described in Example 2, is treated with 50 ml. of 10% alcoholic ammonia and evaporated to dryness in the steam bath. The residue is heated at 200° C. for ½ to 1 hour, cooled, and crystallized from dilute alcohol to give 3-methyl-6-nitro-7-sulfamyl-1,2,4-benzothiadiazine-1,1-dioxide.

EXAMPLE 3

*N-butyryl-5-nitroaniline-2,4-disulfonyl chloride*

By replacing the acetic anhydride employed in Example 2, by an equimolecular quantity of butyric anhydride and following substantially the same procedure as described in Example 2, there is obtained N-butyryl-5-nitroaniline-2,4-disulfonyl chloride.

EXAMPLE 4

*N-caproyl-5-nitroaniline-2,4-disulfonyl chloride*

By replacing the acetic anhydride employed in Example 2 by an equivalent quantity of n-caproic anhydride and following substantially the same procedure described in Example 2, there is obtained N-caproyl-5-nitroaniline-2,4-disulfonyl chloride.

EXAMPLE 5

*N-methyl-5-nitroaniline-2,4-disulfonyl chloride*

By replacing the m-nitroaniline employed in Example 1 by an equimolecular quantity of N-methyl-3-nitroaniline and chlorosulfonating the latter compound by substantially the same procedure described in Example 1, there is obtained N-methyl-5-nitroaniline-2,4-disulfonyl chloride.

EXAMPLE 6

*N-ethyl-5-nitroaniline-2,4-disulfonyl chloride*

By replacing the m-nitroaniline employed in Example 1 by an equimolecular quantity of N-ethyl-3-nitroaniline and following substantially the same procedure described in Example 1, there is obtained N-ethyl-5-nitroaniline-2,4-disulfonyl chloride.

EXAMPLE 7

*N-methyl-5-nitroacetanilide-2,4-disulfonyl chloride*

By replacing the 5-nitroaniline-2,4-disulfonyl chloride employed in Example 2 by an equimolecular quantity of N-methyl-5-nitroaniline-2,4-disulfonyl chloride (prepared as described in Example 5) and following substantially the same procedure described in Example 2, there is obtained N-methyl-5-nitroacetanilide-2,4-disulfonyl chloride.

EXAMPLE 8

*N-benzoyl-5-nitroaniline-2,4-disulfonyl chloride*

By substituting an equal volume of benzoyl chloride for the acetic anhydride employed in Example 2, and following substantially the same procedure described in Example 2, there is obtained N-benzoyl-5-nitroaniline-2,4-disulfonyl chloride.

EXAMPLE 9

*5-nitro-N-phenylacetylaniline-2,4-disulfonyl chloride*

By substituting an equal volume of phenylacetyl chloride for the acetic anhydride employed in Example 2, and following substantially the same procedure described in Example 2, there is obtained 5-nitro-N-phenylacetyl-aniline-2,4-disulfonyl chloride.

EXAMPLE 10

*4-nitroaniline-2,5-disulfonyl chloride*

Step A.—A solution of 17.2 g. of 3-chloro-4-nitroaniline in 300 ml. of ethanol is heated under reflux for ½ to 1 hour with a solution of 30 g. of sodium sulfite in 150 ml. of water. The reaction mixture is cooled in an ice bath and the sodium 5-amino-2-nitrobenzene sulfonate which crystallizes is collected on the filter and dried.

Step B.—An equimolecular quantity of the thus obtained product is substituted for the m-nitroaniline employed in Example 1 and substantially the same procedure described in Example 1 is followed to produce 4-nitroaniline-2,5-disulfonyl chloride.

EXAMPLE 11

*N,N-di-ethyl-5-nitroaniline-2,4-disulfonyl chloride*

By replacing the m-nitroniline employed in Example 1 by an equimolecular quantity of N,N-di-ethyl-m-nitroaniline, and following substantially the same procedure described in Example 1, there is obtained N,N-di-ethyl-5-nitroaniline-2,4-disulfonyl chloride.

EXAMPLE 12

*N,N-benzoylmethyl-5-nitroaniline-2,4-disulfonyl chloride*

By replacing the 5-nitroaniline-2,4-disulfonyl chloride and the acetic anhydride employed in Example 2 by an equimolecular quantity of N-methyl-5-nitroaniline-2,4-disulfonyl chloride (prepared as described in Example 5) and an equal quantity of benzoyl chloride respectively and following substantially the same procedure described in Example 2, there is obtained N,N-benzoylmethyl-5-nitroaniline-2,4-disulfonyl chloride.

EXAMPLE 13

*N-lauroyl-5-nitroaniline-2,4-disulfonyl chloride*

By replacing the acetic anhydride employed in Example 2 by an equal volume of lauroyl chloride, and following substantially the same procedure described in Example 2, there is obtained N-lauroyl-5-nitroaniline-2,4-disulfonyl chloride.

While the above examples describe the preparation of certain compounds illustrated by the structure in column 1, lines 1, 2, 3 and 4, and while the conversion of the novel nitroanilinedisulfonyl chloride compounds to their corresponding disulfamylnitroanilines and to their nitrobenzothiadiazine-1,1-dioxide compounds also has been described, it is to be understood that the invention is not to be limited by these examples or by the specific reaction conditions described for the preparation of the novel compounds or their conversion to products having diuretic properties, but is to be understood to embrace variations and modifications falling within the scope of the appended claims and the introductory disclosure contained herein.

What is claimed is:

1. An anilinedisulfonyl chloride compound having the general structure

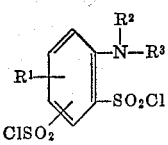

wherein the radical $ClSO_2$— is attached to one of the positions 4 and 5, and the radical $R^1$ is attached to one of the unsubstituted positions 6, 5, and 4, and wherein $R^1$ is the nitro group; $R^2$ is selected from the group consisting of hydrogen and a lower alkyl radical; and $R^3$ is selected from the group consisting of hydrogen, lower alkyl, lower alkanoyl, phenylacetyl, and benzoyl radicals.

2. An anilinedisulfonyl chloride compound having the general structure

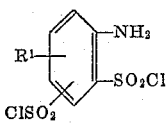

wherein $R^1$ is the nitro group.

3. 5-nitroaniline-2,4-disulfonyl chloride.

4. An anilinedisulfonyl chloride compound having the general structure

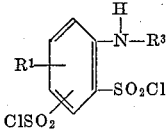

wherein $R^1$ is the nitro group; and $R^3$ is a lower alkanoyl radical.

5. An anilinedisulfonyl chloride compound having the general structure

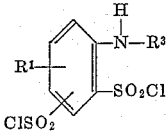

wherein $R^1$ is the nitro group; and $R^3$ is the benzoyl radical.

6. An anilinedisulfonyl chloride compound having the general structure

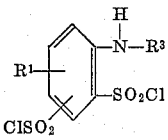

wherein $R^1$ is the nitro group; and $R^3$ is the phenylacetyl radical.

7. A process for the preparation of an anilinedisulfonyl chloride compound wherein a compound having the general formula

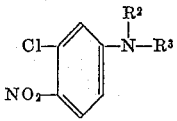

wherein $R^2$ is selected from the group consisting of hydrogen and a lower alkyl radical; and $R^3$ is selected from the group consisting of hydrogen, lower alkyl, lower alkanoyl, phenylacetyl, and benzoyl radicals, is heated with an aqueous solution of sodium sulfite to form a sodium 5-amino-2-nitrobenzenesulfonate which then is heated with chlorosulfonic acid in the presence of an alkali metal halide to form 4-nitroaniline-2,5-disulfonyl chloride having the general structure

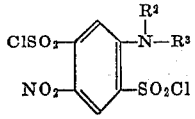

wherein $R^2$ and $R^3$ have the meaning assigned to each of them above.

References Cited in the file of this patent

UNITED STATES PATENTS

| | | |
|---|---|---|
| 1,911,719 | Schweitzer et al. | May 30, 1933 |
| 1,939,025 | Schweitzer | Dec. 12, 1933 |
| 2,261,175 | McNally | Nov. 4, 1941 |

OTHER REFERENCES

Lustig et al.: Monatshefte fur Chemie, vol. 48, pp. 87–98 (1927).